United States Patent [19]
Eibeck et al.

[11] 3,974,265
[45] Aug. 10, 1976

[54] CHLORINE PENTAFLUORIDE COMPLEXES

[75] Inventors: Richard E. Eibeck, Convent Station; William B. Fox, Wharton; Bernard Sukornick, Morristown, all of N.J.

[73] Assignee: Allied Chemical Corporation, Morris Township, N.J.

[22] Filed: Apr. 27, 1965

[21] Appl. No.: 452,455

[52] U.S. Cl................................. 423/466; 423/472
[51] Int. Cl.². ............................................ C01B 7/24
[58] Field of Search ............. 23/85, 98, 205; 149/1; 423/466, 472

[56] References Cited
OTHER PUBLICATIONS

Schmeisser et al., Angew. Chem., vol. 69, p. 781 (1957).

*Primary Examiner*—Leland A. Sebastian
*Attorney, Agent, or Firm*—Ernest A. Polin; Jay P. Friedenson

EXEMPLARY CLAIM

1. Compounds of the formula:

$$ClF_5 \cdot XF_5$$

wherein X is a member selected from the group consisting of As and Sb.

8 Claims, No Drawings

CHLORINE PENTAFLUORIDE COMPLEXES

This invention relates to novel complexes of chlorine pentafluoride ($ClF_5$) with certain fluorine containing Lewis acids and more particularly relates to $ClF_5 \cdot AsF_5$ and $ClF_5 \cdot SbF_5$, and to processes for making the same. These compounds are useful as fluorinating agents and as intermediates in the preparation of high-energy oxidizers.

In accordance with the invention, it has been found that the $ClF_5 \cdot AsF_5$ and $ClF_5 \cdot SbF_5$ complexes may be prepared by reacting $ClF_5$ with either $AsF_5$ or $SbF_5$, respectively.

The $ClF_5 \cdot AsF_5$ complex is a white solid with a vapor pressure of about 280 mm Hg at room temperature. The $ClF_5 \cdot SbF_5$ complex is also a white solid and has a negligible vapor pressure at room temperature.

General practice of the preferred embodiment of the invention process, as illustrated by the preparation of $ClF_5 \cdot AsF_5$, comprises condensing essentially equimolar quantities of $ClF_5$ and $AsF_5$ into a suitable reaction vessel and then permitting the reactant mixture to warm slowly to about room temperature, during which time the reaction takes place and the corresponding white solid complex is formed.

$AsF_5$ is normally a colorless gas and has a boiling point of about −53°C. and a melting point of about −80°C. $SbF_5$ is normally a colorless viscous liquid and has a boiling point of about 149.5°C. and a melting point of about 7°C. Both of these compounds are commercially available. Small amounts of impurities contained in the commercial products, such as $BF_3$, $CF_4$ and $SiF_4$ may be removed by pumping under vacuum.

$ClF_5$ may be produced by reacting $ClF_3$ with fluorine at elevated temperatures and pressures, as described more in detail in co-pending, commonly assigned application of John E. Wilkalis, Charles G. Barbaz and Horace Q. Trout, Ser. No. 389,527, filed Aug. 12, 1964.

Apparatus suitable for practice of the subject invention includes the conventional vacuum manifold, provided with a standard vacuum pump and valved outlets to reactant and reaction vessels which may, in turn, be provided with cooling means, such as dry ice, or liquid nitrogen traps, or other suitable cooling means. Materials of construction of the manifold may include any suitable material, such as quartz, glass, Plaskon, Teflon, Monel or steel. The reactant and reaction vessels are preferably constructed of some non-corrosive material, such as Plaskon, Teflon or Monel.

In practice of the invention, the desired proportions of $ClF_5$ and the fluorine containing Lewis acids are condensed, either singly or together, by means of the vacuum manifold, which is placed under a vacuum of about one micron or less of mercury pressure, into a reaction vessel, which reaction vessel is subjected to the influence of cooling means, e.g. a −196°C. liquid nitrogen bath. The reactant mixture is then allowed to warm slowly to about room temperature, during which time substantial amounts of the white solid reaction product are formed. The excess reactants are removed from the solid product by pumping the reaction vessel under vacuum, for a short time, which serves to vaporize and drive off the excess reactants.

In a preferred embodiment the $ClF_5$ and $AsF_5$ or $SbF_5$ reactants should be combined when both reactants employed are in liquid phase. This can be accomplished, as described above, by condensing the reactants through a vacuum manifold into a reaction vessel which is maintained at temperatures below the boiling points of the reactants. Still preferably, the reactants are condensed into the reaction vessel at temperatures below their melting points and are deposited therein as solids. In this manner, the vapor pressure of the reaction mixture system will be low and the system may be closed off before vaporization and undue loss of reactants from the reaction vessel occurs. As the reactants warm up past their melting points, they assume the liquid state and react efficiently and smoothly with one another. Small amounts of the desired product will be formed if each of the reactants contacted is in gaseous phase and better yields of the product will be obtained when one of the reactants contacted is in gaseous phase and the other is in liquid phase. In the case of the production of the $ClF_5 \cdot SbF_5$ complex, since the $SbF_5$ reactant is liquid at room temperature, the reactants can be combined, if desired, by merely bubbling $ClF_5$ into $SbF_5$ at room temperature and substantial amounts of the product will be formed.

An excess of one or the other reactants will not deleteriously affect the formation of the respective complexes. The reactants, however, should be combined in equimolar portions in order to minimize purification efforts. In the case of the $ClF_5 \cdot SbF_5$ complex, in view of the relatively high boiling point of $SbF_5$ (149.5°C.), a relatively high temperature would be required in order to remove this material as excess reactant. In view of the increased risk of deterioration of product at higher temperatures, it is expedient to operate with a molar excess of $ClF_5$ which can be vaporized and pumped off more easily.

There is no particular criticality in operating temperatures for the contacting of the $ClF_5$ and fluorine containing Lewis acid reactants. Reaction, although slight, will take place at the temperature of a liquid nitrogen bath (about −196°C.) and at temperatures up to about room temperature. As discussed previously, the reaction will proceed best when both reactants are in liquid phase. The optimum temperature conditions are therefore, those temperatures at which both of the reactants will be in liquid phase. For example, in the case of the reaction of $ClF_5$ with $AsF_5$, both reactants will be in liquid phase at temperatures above about −80°C.; in the case of the reaction of $ClF_5$ with $SbF_5$, both reactants will be in liquid phase, in a closed system under autogenous pressure, at temperatures above about 7°C. up to the critical temperature of the reactants. There is no need to regulate reaction temperatures, however since some reaction will take place, as indicated above, at very low temperatures and substantially all reaction will take place during the time in which the reactant mixture is allowed to warm to room temperature. Temperatures higher than about room temperature should be avoided, however, since at temperatures significantly above this level, there is risk of thermal decomposition of the products.

Residence times in the reaction vessel are not critical. Substantial amounts of the product will be formed rather quickly, particularly when both reactants reach the liquid state and ordinarily the reaction is substantially complete in about thirty minutes. The point at which the reaction is substantially complete may be determined by simply observing the cessation of formation of the white solid products.

If desired, the $ClF_5 \cdot AsF_5$ and $ClF_5 \cdot SbF_5$ complexes, after being separated from the respective excess reactants, as described hereinbefore and in the following examples, may be further purified from small amounts of solid impurities, which may be present in the reaction vessel, by conventional vacuum sublimation.

The following illustrate practice of the invention.

EXAMPLE 1

$ClF_5$ and $AsF_5$, in a molar ratio of 4:3, were condensed successively through a conventional vacuum manifold, under a vacuum of about one micron, into a Halocarbon tube, which Halocarbon tube was subjected to the influence of a liquid nitrogen trap at about −196°C. After all of the reactant material was condensed into the Halocarbon tube, the Halocarbon tube was sealed off from the vacuum manifold, the nitrogen trap was removed, the reactant mixture was allowed to warm up to room temperature and then was allowed to stand for a period of about one hour. The formation of a white solid was observed and removal of excess $ClF_5$ and $AsF_5$ reactants was accomplished by reconnecting the Halocarbon tube to the vacuum manifold and pumping the system under vacuum for several minutes. After pumping, the white solid product was further purified by vacuum sublimation and the purified material was subjected to elemental analysis and identified as being $ClF_5 \cdot AsF_5$ complex.

Analysis: Calculated for $AsClF_{10}$; % As, 24.94; % Cl, 11.80; % F, 63.26. Found: % As, 23.50; % Cl, 11.00; % F, 56.20.

EXAMPLE 2

A slight molar excess of $ClF_5$ was condensed through a conventional vacuum manifold, under a vacuum of about one micron, into a Halocarbon tube, which Halocarbon tube had been charged with a quantity of liquid $SbF_5$ and which Halocarbon tube was subjected to the influence of a liquid nitrogen trap at about −196°C. After all of the $ClF_5$ reactant was condensed into the Halocarbon tube, the Halocarbon tube was sealed off from the vacuum manifold and the liquid nitrogen trap was removed. The reactant mixture was allowed to warm to about room temperature and was then allowed to stand for a period of about thirty minutes. It was observed that a quantity of a white solid had formed. The Halocarbon tube was then reconnected to the vacuum manifold and the excess $ClF_5$ reactant was removed by pumping under vacuum for a few minutes. The white solid product was identified as being $ClF_5 \cdot SbF_5$ complex.

EXAMPLE 3

A quantity of the $ClF_5 \cdot AsF_5$ complex produced in Example 1 was contacted with approximately equimolar portions of liquid $SO_2$ in a Halocarbon tube at room temperature and the mixture was allowed to stand overnight. A colorless vapor, identified by Nuclear Magnetic Resonance and infrared spectrum analyses as being $SO_2F_2$, was formed. $SO_2F_2$ is a known compound which is known to be useful as a fumigant.

EXAMPLE 4

A quantity of the $ClF_5 \cdot AsF_5$ complex produced in Example 1 was contacted with approximately equimolar portions of $FSO_3H$ in a Halocarbon tube at room temperature and the mixture was allowed to stand overnight. A colorless vapor, identified by Nuclear Magnetic Resonance and infrared spectrum analyses as being $FSO_2OF$, was formed. $FSO_2OF$ is a known compound which is known to be useful as a polymerization catalyst.

EXAMPLE 5

A quantity of the $ClF_5 \cdot SbF_5$ complex produced in Example 2 is contacted with approximately equimolar portions of liquid $SO_2$ in a Halocarbon tube at room temperature and the mixture is allowed to stand overnight. A colorless vapor, identified as being $SO_2F_2$, is formed.

EXAMPLE 6

A quantity of the $ClF_5 \cdot SbF_5$ complex produced in Example 2 is contacted with approximately equimolar portions of $FSO_3H$ in a Halocarbon tube at room temperature and the mixture is allowed to stand overnight. A colorless vapor, identified as being $FSO_2OF$, is formed.

We claim:
1. Compounds of the formula:

$$ClF_5 \cdot XF_5$$

wherein X is a member selected from the group consisting of As and Sb.

2. $ClF_5 \cdot AsF_5$.
3. $ClF_5 \cdot SbF_5$.
4. The process for preparing compounds of the formula:

$$ClF_5 \cdot XF_5$$

wherein X is a member selected from the group consisting of As and Sb, which comprises reacting $ClF_5$ with a compound of the formula:

$$XF_5$$

wherein X is a member selected from the group consisting of As and Sb.

5. The process according to claim 4 which is carried out when at least one of the $ClF_5$ or $XF_5$ reactants is in liquid phase.

6. The process according to claim 4 which is carried out when both $ClF_5$ and $XF_5$ reactants are in liquid phase.

7. The process for preparing $ClF_5 \cdot AsF_5$ which comprises reacting $ClF_5$ and $AsF_5$ when both $ClF_5$ and $AsF_5$ reactants are in liquid phase.

8. The process for preparing $ClF_5 \cdot SbF_5$ which comprises reacting $ClF_5$ and $SbF_5$ when both $ClF_5$ and $SbF_5$ reactants are in liquid phase.

* * * * *